United States Patent Office 3,169,141
Patented Feb. 9, 1965

3,169,141
PROCESS FOR THE RECOVERY OF ORGANIC ISOCYANATES
Ehrenfried H. Kober, Hamden, and Wilhelm J. Schnabel, Branford, Conn., assignors to Olin Mathieson Chemical Corporation, a corporation of Virginia
No Drawing. Filed Sept. 18, 1962, Ser. No. 224,523
15 Claims. (Cl. 260—453)

This invention relates to an improvement in processes for the production of organic isocyanates. More particularly, this invention relates to a process for recovering organic isocyanates from crude mixtures containing the same.

Organic isocyanates can be prepared by reacting phosgene with a primary amine corresponding to the desired isocyanate as is well known in the art. The amine is usually employed in the form of its hydrochloride, although the free amine has been used in certain modifications of this process. In place of phosgene, compounds which liberate phosgene during the reaction can also be employed. It is also known that potassium cyanate may be reacted with an organic sulfate to produce the corresponding organic isocyanate. It has also been proposed to produce organic isocyanates by pyrolyzing an N-substituted carbamate followed by separation of the corresponding isocyanate from the pyrolysis products before the latter have had time to reunite and form the starting N-substituted carbamate. Any of the mentioned reactions can be conducted in the presence or absence of an inert organic liquid diluent.

During the reactions listed above for the production of organic isocyanates, which are often carried out at elevated temperatures, and during subsequent steps for the treatment of the reaction mixture to recover the organic isocyanates, which usually involves one or more distillation steps, by-products and polymers of the desired organic isocyanates are produced. When the inert organic liquid diluent or solvent and the major portion of the isocyanate are removed by distillation, the by-product both consumes and entraps considerable quantities of the isocyanate product. Moreover, if the distillation temperature is raised in an effort to remove the residual isocyanate from the residue, the residue solidifies to a brittle mass, which creates operating problems, since such materials can be removed from the reactor or still pot only with considerable difficulty.

It is an object of this invention to overcome the above disadvantages and to provide a new method for separating organic isocyanates from crude reaction mixtures.

It is another object of this invention to provide an improved process for increasing the overall yield of organic isocyanates in processes for producing them.

These and other objects of the invention will be apparent from the following detailed description of the invention.

In accordance with the present invention, a process is provided for recovering an organic isocyanate from a crude reaction mixture containing the same in which the organic isocyanate is distilled from the crude mixture in the presence of an organic silane selected from the group consisting of alkylsilanes, arylsilanes, arylalkylsilanes, and mixtures thereof. The silanes are thermally stable and liquid under the conditions of the distillation and have boiling points above that of the organic isocyanate present in the crude reaction mixture.

The term "liquid organic silane" as used throughout the description and claims is intended to include organic liquid silanes which are liquid under the reaction conditions employed. This term includes silanes which are solid at room temperature as well as those which are liquid at room temperature.

Distilling the crude reaction mixture in the presence of a liquid organic silane in accordance with the process of this invention results in increased yields of the desired organic isocyanate and also permits recovery of organic isocyanates from residues which formerly were discarded. The mechanism by which the desired results are achieved in the process of this invention is not completely understood. However, it is believed that the thermally stable silanes act as heat exchange media which appears to have a depolymerizing action on the organic isocyanate and/or a fluidizing effect on the pot residue. The particular silanes employed, according to this invention, must have a boiling point higher than that of the organic isocyanate being recovered by distillation and must be liquid and stable under the conditions of the distillations by which the isocyanate is removed from the crude reaction mixture.

Silanes having these properties which can be employed in the instant invention are well known in the art. For example, silanes which are particularly suitable for use in the instant invention are the bis-aryloxyphenyldialkylsilanes disclosed in U.S. Patent No. 3,013,044, issued December 12, 1961, to Wilhelm J. Schnabel, and the liquid monoalkyl-tris-alkylphenylsilanes of the general formula

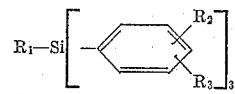

wherein $R_1$ and $R_2$ are alkyl radicals and $R_3$ is hydrogen or an alkyl radical, which are disclosed in U.S. Patent No. 3,020,300, issued February 6, 1962, to Wilhelm J. Schnabel. The chemical and physical properties of these silanes are especially advantageous because these compounds are characterized by an unusually wide liquid range and exhibit excellent thermal stability combined with hydrolytic and oxidative stability. Other silanes which are suited by virtue of their stability and wide liquid range for the purpose of the present invention are also described in the literature, for example, in "Chemistry of the Silicones," by E. G. Rochow, John Wiley and Sons, Inc., New York. Typical examples of suitable silanes which may be employed in carrying out this invention are ethyl-tris-p-ethylphenylsilane, n-propyl-tris-p-ethylphenylsilane, n-butyl-tris-p-ethylphenylsilane, n-butyl-tris-p-n-propylphenylsilane, ethyl-tris-diethylphenylsilane, bis-(4-phenoxyphenyl)-dimethylsilane, bis-(4-phenoxyphenyl)-diethylsilane, bis-[4-(3'-methylphenoxy)-phenyl]-dimethylsilane, bis-[4'-(3'-methylphenoxy)-phenyl]-diethylsilane, bis - [4 - (2' - methylphenoxy) - phenyl] - diethylsilane, bis-[4-(3'-ethylphenoxy)-phenyl]-diethylsilane, tetrakis-decylsilane, dioctyl-didodecylsilane, tetrakis-tolylsilane, and mixtures thereof.

The amount of the particular silane or mixtures of silanes employed must be sufficient to yield a fluid distillation mass, which may be in the form of a solution, dispersion, or suspension, etc. It has been found desirable to employ an amount in excess of this minimum amount. The optimum amount to be utilized in any particular instance to achieve the desired maximum recovery of organic isocyanate can be readily determined by a person skilled in the art and will depend upon the particular organic isocyanate mixture being treated, the particular silane derivative employed, and the conditions of distillation. Generally from about 5 to 200 percent and preferably from about 10 to 50 percent of the silane, based on the weight of the organic isocyanate in the mixture, is used.

The process of this invention can be utilized generally for the recovery of organic isocyanates from crude reaction mixtures, i.e., aliphatic, cycloaliphatic, aryl, aralkyl, and heterocyclic mono-, di- and poly-isocyanates. Examples of organic isocyanates which can be recovered from crude reaction mixtures according to the process of this invention are hexylisocyanate, octlyisocyanate, dodecylisocyanate, octadecylisocyanate, tetramethylene diisocyanate, pentamethylene diisocyanate, octamethylene diisocyanate, undecamethylene, diisocyanate, dodecamethylene diisocyanate, 3,3'-diisocyanate dipropyl ether, cyclohexyl isocyanate, tetrahydro-α-naphthyl isocyanate, tetrahydro-β-naphthyl isocyanate, xylene diisocyanates, diphenylmethane 4,4'-diisocyanate, β,β'-diphenylpropane 4,4'-diisocyanate, benzyl isocyanate, phenylethyl isocyanate, p-isocyanato benzyl isocyanate, phenyl isocyanate, p-cetyl phenyl isocyanate, p-dodecylphenyl isocyanate, 5-dodecyl-2-methylphenyl isocyanate, 3-nitro-4-dodecylphenyl isocyanate, p-cetyloxyphenyl isocyanate, metaphenylene diisocyanate, p-phenylene diisocyanate, naphthylene 1,4-diisocyanate, 2,4-tolylene diisocyanate, 2,6-tolylene diisocyanate, 1,3,5-benzene triisocyanate, tetrahydrofurfuryl isocyanate, and mixtures thereof.

The distillation technique employed in the process of this invention is carried out in a conventional manner well known in the art. Where successive distillation steps are required as in the case when an inert liquid diluent boiling at a temperature below the boiling point of the isocyanate is present in the crude reaction mixture, the diluent can, for example, be recovered first in a separate distillation step and the isocyanate product recovered in a second distillation step employing a second distillation column. The silane is added to the crude reaction mixture before the first distillation step or it can be added just prior to the distillation step in which the isocyanate is removed. If the inert liquid diluent or solvent has a boiling point higher than that of the organic isocyanate, the silane is added to the crude reaction mixture before distillation. In general, the conditions of temperature and pressure utilized in the distillation process of this invention will depend upon such factors as the components in the mixture being distilled, on the particular isocyanate product being recovered, etc. The residue resulting after distillation of the isocyanate product consists essentially of the added silane and the undistillable by-products when the boiling point of the diluent employed is below that of the isocyanate. When the diluent has a boiling point above that of the isocyanate product, the residue resulting after distillation contains the added silane, the undistillable by-products, and the solvent. In each case, the residue is in a fluid state after removal of the isocyanate product and, therefore, can be easily removed from the still. In marked contrast, when no silane is employed, the residue is a solid which is extremely difficult to remove from the still pot.

The silanes may be recovered from the distillation residues either by filtration, by centrifugation, by distillation, or by extraction with a suitable solvent. If extraction is suited for the recovery of the silanes, the solvent employed for extraction is preferably one which is being used in the process for the production of isocyanates, such as for example a halogenated aromatic hydrocarbon. The resulting extract containing the silanes may then be reused directly or after total or partial removal of the solvent for recycling the silanes.

In the following examples, parts are by weight unless otherwise indicated. The examples illustrate the manner in which the subject invention can be carried out and are not limititng.

Example I

The preparation of the diisocyanate was achieved in a 3-liter, three-necked, round-bottom flask, equipped with gas inlets for nitrogen, hydrogen chloride and phosgene, a paddle stirrer and a water-cooled condenser. The water-cooled condenser was vented to a Dry Ice condenser mounted at the top of a graduated receiver in which the unreacted phosgene was trapped. The outlet of Dry Ice condenser was vented to a sodium hydroxide scrubber which was used to estimate the amount of hydrogen chloride evolved during the phosgenation. An amount of 183.5 grams (1.5 mole) of 2,4-tolylene diamine and 2000 grams of o-dichlorobenzene were charged to the flask and solution or suspension was accomplished by stirring. After flushing with nitrogen, anhydrous hydrogen chloride was passed into the agitated reaction mixture at 100–110° C. The resulting slurry was then heated to 150–155°C. and phosgene was passed in at this temperature, while agitation was continued. An excess of about 250 percent of phosgene was required to achieve 100 percent conversion as measured by the amount of hydrogen chloride evolved during the phosgenation procedure which was completed after six hours. The mixture was then purged with nitrogen at the reflux temperature of the solvent.

One part (31.5 percent) of the resulting crude solution was placed in a 1-liter round-bottom flask equipped with a 6 inch glass column packed with glass helices. The principal part of the o-dichlorobenzene distilled between 35°–40° C. at 1–2 mm. pressure and the tolylene diisocyanate at 80°–85° C. at 0.5–1.0 mm. pressure. The oil bath temperature during the distillation of the tolylene diisocyanate was maintained at 125°–130° C. After distillation had ceased, heating at 130° C. and 0.5 mm. pressure was continued for about half an hour. About 53.2 grams (64.5 percent of the theoretical yield) of tolylene diisocyanate, which had a refractive index at 23° C. of 1.5678, was obtained.

To the residue thus obtained, 30 grams of ethyl-tris-p-ethylphenylsilane was added and heating under 0.5–1.0 mm. pressure at 130° C. oil bath temperature was continued. Within about 10 minutes, an additional amount of 5.8 grams of tolylene diisocyanate, having a refractive index at 23° C. of 1.5680, was obtained, raising the yield to a total of 59.0 grams (71.5 percent of the theoretical yield). The residue was a fluid viscous oil.

Example II

Tolylene diisocyanate was prepared in a continuous process from a crude tolylene diamine mixture consisting essentially of a mixture of the 2,4- and 2,6-isomer in a ratio of 80:20. Monochlorobenzene was employed as the solvent for the preparation of the diisocyanate. Stream samples, taken from the reactor effluent during the continuous operation, were purged with nitrogen to remove excessive phosgene and hydrogen chloride formed. The purged samples were divided into several parts which were worked-up under various conditions.

(a) A 2000 gram sample of the crude reaction mixture, containing 9.7 percent of tolylene diisocyanate (194.2 grams) as indicated by titration analysis, was subjected to distillation to remove most of the solvent. The concentrate, thus obtained, was then flash distilled at 0.5–1.0 mm. by dropping it through a funnel slowly into a flask which was submerged in an oil bath kept at 180° C. The total amount of tolylene diisocyanate present in the distillates was found to be 171.8 grams which represented a recovery of 88.7 percent of the original amount of TDI. The distillation flask contained a solid resinous residue which could not be removed mechanically from the flask.

(b) Another 2000 gram sample of the crude reaction mixture containing 9.7 percent of tolylene diisocyanate was worked-up in the same way as described under (a). Prior to any distillation, however, an amount of 30 grams of bis-p-phenoxyphenyl-dimethylsilane was added. The total amount of tolylene diisocyanate found in the distillate was 183.0 grams corresponding to a recovery of 94.2 percent of the original TDI. The distillation residue remained liquid and could be removed easily from the distillation flask.

Example III

A solution of TDI in monochlorobenzene as obtained by continuous phosgenation of a 80:20 mixture of 2,4- and 2,6-tolylene diamine was concentrated by distillation through a long tube. The resulting concentrate of 691 grams, containing 40.45 percent of tolylene diisocyanate, was divided into two equal parts.

(a) One part was flash distilled at 0.5–1.0 mm. pressure by dropping it slowly through a funnel into a flask which was submerged in an oil bath kept at 180° C. The distillate contained 122.5 grams of tolylene diisocyanate which represents a recovery of 87.5 percent of the original isocyanate. The distillation flask contained a solid resinous residue which could not be removed mechanically from the flask.

(b) The other part of the concentrate was flash distilled under the same conditions, but an amount of 30.0 grams of dioctyl-didodecylsilane was added prior to the distillation. In this case, the distillate contained 130.0 grams of tolylene diisocyanate which corresponds to a recovery of 93.0 percent.

Various modifications of the invention, some of which have been referred to above, will be apparent to those skilled in the art from this disclosure and are intended to be within the scope of this invention.

We claim:

1. A process for the recovery of an organic isocyanate from a crude reaction mixture containing said isocyanate which comprises admixing with said crude reaction mixture a liquid organic silane having a boiling point above the boiling point of said organic isocyanate, said liquid organic silane being selected from the group consisting of alkylsilane, arylsilane, arylalkylsilane, and mixtures thereof, and distilling said organic isocyanate from the resulting mixture at a temperature above the boiling point of said organic isocyanate and below the boiling point of said liquid organic silane.

2. The process of claim 1 wherein the proportion of said liquid organic silane is between about 5 and 200 percent by weight of said organic isocyanate in said crude reaction mixture.

3. The process of claim 1 wherein said organic isocyanate is an aryl isocyanate.

4. The process of claim 1 wherein said organic isocyanate is 2,4-tolylene diisocyanate.

5. The process of claim 1 wherein said organic isocyanate is a mixture of 2,4-tolylene diisocyanate and 2,6-tolylene diisocyanate.

6. The process of claim 1 wherein the proportion of said liquid organic silane is about 5 and 50 percent by weight of said organic isocyanate in said crude reaction mixture.

7. The process of claim 1 wherein said liquid organic silane is ethyl-tris-p-ethylphenylsilane.

8. The process of claim 1 wherein said liquid organic silane is bis-p-phenoxyphenyldimethylsilane.

9. The process of claim 1 wherein said liquid organic silane is dioctyl-didodecylsilane.

10. The process for recovering an aromatic organic isocyanate from a crude reaction mixture containing said aromatic isocyanate which comprises admixing said crude reaction mixture with a liquid organic silane selected from the group consisting of alkylsilane, arylsilane, arylalkylsilane, and mixtures thereof, said liquid organic silane having a boiling point higher than the boiling point of said aromatic isocyanate, said liquid organic silane being added in a proportion equivalent to between about 5 and 200 percent by weight of said aromatic isocyanate in said crude reaction mixture, and distilling from the resulting mixture said aromatic isocyanate at a temperature above the boiling point of said aromatic isocyanate and below the boiling point of said liquid organic silane.

11. The process of claim 10 wherein said aromatic isocyanate is 2,4-tolylene diisocyanate.

12. The process of claim 10 wherein said aromatic isocyanate is a mixture of 2,4-tolylene diisocyanate and 2,6-tolylene diisocyanate.

13. The process of claim 10 wherein said liquid organic silane is ethyl-tris-p-ethylphenylsilane.

14. The process of claim 10 wherein said liquid organic silane is bis-p-phenoxyphenyldimethylsilane.

15. The process of claim 10 wherein said liquid organic silane is dioctyl-didodecylsilane.

References Cited by the Examiner

UNITED STATES PATENTS 2,884,363   4/59   Bloom et al. _____ 260—453

CHARLES B. PARKER, *Primary Examiner.*